US009030131B2

(12) United States Patent
Kado et al.

(10) Patent No.: US 9,030,131 B2
(45) Date of Patent: May 12, 2015

(54) INSULATED POWER SUPPLY DEVICE AND LIGHTING DEVICE

(75) Inventors: Minoru Kado, Hachioji (JP); Satoshi Arima, Inagi (JP); Takashi Inoue, Sagamihara (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 85 days.

(21) Appl. No.: 13/813,218

(22) PCT Filed: Jul. 26, 2011

(86) PCT No.: PCT/JP2011/066888
§ 371 (c)(1),
(2), (4) Date: Jan. 30, 2013

(87) PCT Pub. No.: WO2012/014856
PCT Pub. Date: Feb. 2, 2012

(65) Prior Publication Data
US 2013/0134892 A1 May 30, 2013

(30) Foreign Application Priority Data

Jul. 30, 2010 (JP) .................................. 2010-171970

(51) Int. Cl.
*H05B 37/02* (2006.01)
*H02M 3/335* (2006.01)
*H05B 33/08* (2006.01)
(52) U.S. Cl.
CPC ........... *H02M 3/33523* (2013.01); *H05B 37/02* (2013.01); *H05B 33/0815* (2013.01); *H05B 33/0848* (2013.01); *Y02B 20/347* (2013.01)
(58) Field of Classification Search
USPC .................. 315/294, 206, 291, 307; 345/212
See application file for complete search history.

(56) References Cited

U.S. PATENT DOCUMENTS 6,952,355 B2 * 10/2005 Riggio et al. ............... 363/21.15
7,583,035 B2 * 9/2009 Shteynberg et al. .......... 315/307
(Continued)

FOREIGN PATENT DOCUMENTS

JP 07-031142 A 1/1995
JP 2000-354375 A 12/2000
(Continued)

OTHER PUBLICATIONS

International Search Report dated Oct. 18, 2011 issued in International Appln. No. PCT/JP2011/066888.
English translation of an International Preliminary Report on Patentability (IPRP) including Written Opinion dated Feb. 5, 2013, in parent International Application No. PCT/JP2011/066888.

*Primary Examiner* — Thuy Vinh Tran
*Assistant Examiner* — Syed M Kaiser
(74) *Attorney, Agent, or Firm* — Holtz, Holtz, Goodman & Chick PC (57) ABSTRACT

An insulated power supply device includes: an electric power conversion unit, a rectifier, a filter, a detection unit, a control circuit, and a signal transmission unit. The control circuit generates and outputs a control signal for a switching element that controls a current to be flown through a primary side of the electric power conversion unit. The signal transmission unit transmits, to the control circuit, a detection signal by the detection unit for detecting an output current or an output voltage. An output control pulse signal having control information in a duty ratio can be supplied as an outputted control signal individually to both of the control circuit and a secondary side of the electric power conversion unit. The output current or the output voltage can be thereby controlled.

6 Claims, 6 Drawing Sheets

(56) References Cited

U.S. PATENT DOCUMENTS

| | | | |
|---|---|---|---|
| 7,667,408 B2* | 2/2010 | Melanson et al. | 315/209 R |
| 8,730,228 B2* | 5/2014 | Yonemaru et al. | 345/212 |
| 8,829,812 B2* | 9/2014 | Veltman | 315/307 |
| 8,866,403 B2* | 10/2014 | Nerone | 315/291 |
| 2010/0019692 A1* | 1/2010 | Kimura | 315/294 |
| 2011/0057577 A1 | 3/2011 | Otake et al. | |
| 2011/0193269 A1* | 8/2011 | Ito et al. | 264/400 |

FOREIGN PATENT DOCUMENTS

| | | | | |
|---|---|---|---|---|
| WO | WO2009/119619 A1 * | 10/2009 | | H02M 3/28 |
| WO | WO 2009/119619 A1 | 10/2009 | | |

* cited by examiner

FIG. 4A  PWM PULSE

FIG. 4B  OUTPUT CURRENT (NOT CORRECTED)

FIG. 4C  OUTPUT CURRENT (CORRECTED)

INSULATED POWER SUPPLY DEVICE AND LIGHTING DEVICE

This application is a U.S. National Phase Application under 35 USC 371 of International Application PCT/JP2011/066888 filed Jul. 26, 2011.

TECHNICAL FIELD

The present invention relates to a technology effective for use in an insulated power supply device including a voltage converting transformer, and in a lighting device using the same.

BACKGROUND ART

In a power supply device, there is an insulated AC-DC converter, which includes a voltage converting transformer, converts a voltage of alternating current power, rectifies an alternating current induced on a secondary side, and converts the alternating current into a direct current voltage at a desired potential. As the insulated AC-DC converter, for example, there is known a switching power supply device configured to control a voltage to be induced in a secondary side winding by performing switching control for a current flowing through a primary side winding of the voltage converting transformer.

Incidentally, in the switching power supply device, it is frequent that pulse width modulation (PWM) control is adopted in order to enhance electric power efficiency. Also in the insulated AC-DC converter, there is proposed an invention configured in such a way that a detection signal of a secondary side output is fed back to a primary side control circuit by a photo coupler, and that the primary side control circuit performs ON/OFF drive for the switching element by a PWM pulse to control a current flowing through a primary side coil (refer to Patent Document 1, for example).

PRIOR ART DOCUMENTS

Patent Documents

Patent Document 1: Japanese Patent Application Laid Open Publication No. H07-31142

DISCLOSURE OF THE INVENTION

Problems to be Solved by the Invention

Such a power supply device disclosed in Patent document 1 is a device that feeds back the detection signal of the output from the secondary side through the photo coupler to the primary side control circuit, and accordingly, can control an output voltage to be maintained constantly. In the case where the output voltage is desired to be changed by an external control signal, for example, there is conceived a method of changing a reference voltage of a secondary side error amplifier, which detects the output and generates a feedback signal, by the external control signal. However, it is frequent that the error amplifier has a relatively large time constant, and in that case, a delay occurs in the feedback signal by the time constant concerned, and there is a malfunction that it becomes difficult to control the output quickly since response characteristics of the circuit are deteriorated.

The inventors of the present invention have examined a method of adjusting brightness by PWM control in a power supply device that performs current drive as in an LED lamp. Note that, unlike the above-mentioned local PWM control in the primary side control circuit, the PWM control mentioned here refers to control in which a PWM control signal is supplied from the outside. Conventionally, with regard to such a power supply device that performs dimming control by the PWM control signal from the outside, there are: a dimming method of changing a pulse width of an output current, which is to be intermittently flown through a load, in response to an external PWM control signal (this dimming method is referred to as PWM dimming); a dimming method of changing an absolute value of an output current, which is to be continuously flown through the load, in response to a duty ratio of the external PWM control signal (this dimming method is referred to as DC dimming); and the like.

Among them, the DC dimming method has a malfunction that linearity of the brightness with respect to an average current is poor in comparison with the PWM dimming. Moreover, in the DC dimming method, it is necessary that an absolute value of a feedback voltage be changed when the duty ratio of the external PWM control signal is changed, and accordingly, the DC dimming method has a malfunction that a response becomes slow.

Meanwhile, in the PWM dimming method, in the case where the external PWM control signal is inputted only to the primary side control circuit, when the duty ratio of the external PWM control signal is changed, the PWM dimming method has a malfunction that the dimming control cannot be performed since the feedback signal is deviated from a desired level and a peak value of the output current is changed. Note that this malfunction will be described in detail in embodiments.

Figure 10:
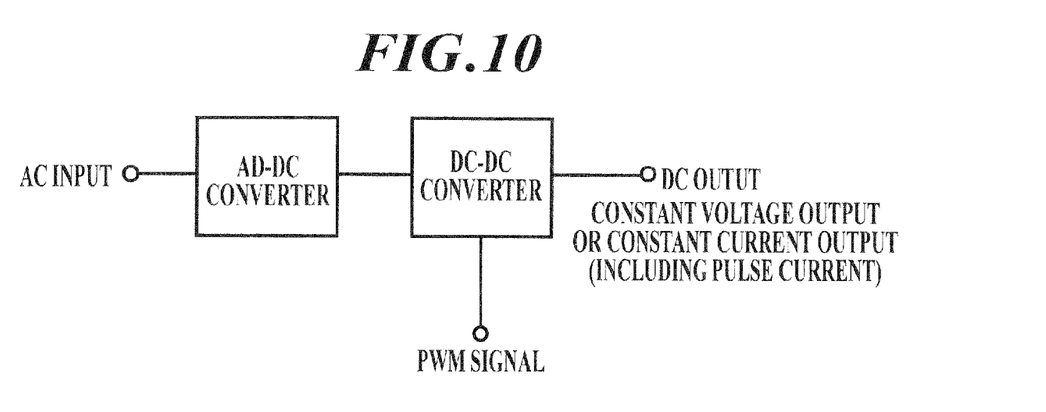
FIG. 10 is a schematic configuration diagram showing a configuration example of a conventional insulated AC-DC converter that controls the output current (sometimes a pulse current) by the PWM control signal.

Moreover, heretofore, in such a case of controlling the output current by the external PWM control signal, then in general, as shown in FIG. 10, a procedure has been performed, in which a DC-DC converter is connected to a subsequent stage of the insulated AC-DC converter, and the PWM control signal is inputted from the outside to the DC-DC converter at the subsequent stage, whereby the absolute value of the output current or the pulse width of the pulse current is changed. However, in such a two-converter type power supply device as shown in FIG. 10, the number of components is increased, and accordingly, there are problems that a cost increase is brought about, and in addition, that miniaturization thereof is difficult.

It is an object of this invention to make it possible to realize a power supply device, which is excellent in responsiveness and is capable of controlling an output thereof by the external control signal, by one insulated AC-DC converter by providing PWM control pulse signals individually to a primary side circuit and a secondary side circuit.

Means for Solving the Problems

In order to achieve the above described object, there is provided an insulated power supply device comprising: an electric power conversion unit for converting alternating current power inputted to a primary side and outputting the power to a secondary side; a rectifier provided on the secondary side of the electric power conversion unit; a filter that passes therethrough voltage/current within a predetermined frequency band in voltage/current rectified by the rectifier; a detection unit for detecting an output current or an output voltage, which is to be supplied to a load through the filter; a control circuit that generates and outputs a control signal for a switching element that controls a current in response to a detection signal by the detection unit, the current being to be flown through the primary side of the electric power conversion unit; and a signal transmission unit for transmitting the detection signal by the detection unit to the control circuit, wherein the outputted control signal is configured to be supplied to both of the control circuit and a circuit on the secondary side of the electric power conversion unit, and to control the output current or the output voltage.

In accordance with the configuration as described above, the power supply device, which is excellent in the responsiveness and is capable of controlling the output by the external control signal, can be realized by one insulated AC-DC converter.

Here, preferably, the outputted control signal is an output control pulse signal having control information in a duty ratio, and the filter is configured so that a cutoff frequency thereof can become higher than a frequency of the output control pulse signal, the control circuit includes a mask circuit that blocks the control signal, which is to be supplied to the switching element, based on the output control pulse signal to be supplied to an outside, and on the secondary side of the electric power conversion unit, a correction unit is provided, the correction unit being for, based on the output control pulse signal, compensating a drop of the detection signal, which is caused by a fact that the mask circuit blocks the control signal, and performing a correction so that a feedback signal to the control circuit cannot be changed.

The cutoff frequency of the filter is set higher than the frequency of the output control pulse signal, and there is provided the correction unit for performing the correction so that the feedback signal cannot be changed even if the duty ratio of the output control pulse signal is changed, whereby the peak value of the output is suppressed from being changed, and in the case where the load is the LED lamp, the linearity of the dimming control by the output control pulse signal can be enhanced.

Moreover, preferably, the control circuit includes a comparator circuit that compares a waveform signal with a frequency higher than the frequency of the output control pulse signal and the feedback signal transmitted from the secondary side of the electric power conversion unit by the signal transmission unit, and that generates a PWM control pulse as the control signal of the switching element, and the mask circuit is configured to be capable of controlling supply of the PWM control pulse to the switching element based on the output control pulse signal.

In such a way, it becomes possible to realize a power supply device capable of controlling the output current or the output voltage by the output control pulse signal from the outside while controlling the switching element by the PWM pulse in the control circuit on the primary side.

Further, preferably, the detection unit includes an error amplifier circuit that output a signal proportional to a potential difference between a predetermined reference voltage and a voltage corresponding to the output current or the output voltage, and to the reference voltage or a detection voltage, the correction unit inputs, as a correction signal, a voltage relatively changed in response to the duty ratio of the output control pulse signal.

In such a way, the correction unit for performing the correction of compensating the drop of the detection signal, which is caused by the fact that the mask circuit blocks the control signal, can be easily realized, for example, by a simple circuit such as a filter capable of averaging the pulse. Note that the matter that the reference voltage is relatively changed stands for that a voltage change corresponding to the duty ratio of the output control pulse signal may be given to either voltage to be inputted to an inverting input terminal or non-inverting input terminal of an operational amplifier that composes the error amplifier circuit.

Moreover, preferably, the electric power conversion unit includes a diode/bridge circuit that rectifies an alternating current, and a transformer through which the current rectified by the diode/bridge circuit is to be flown, and to a primary side winding of the transformer, a pulsating flow voltage is applied and a pulsating flow current is flown. In such a way, a power factor of the power supply device can be enhanced.

Further, preferably, the filter is set sc that the cutoff frequency can become higher than the frequency of the output control pulse signal and lower than a frequency of the PWM control pulse. In such a way, noise by the control signal that, drives the switching element that controls the current to be flown through the primary side of the electric power conversion unit can be prevented from being propagated to the secondary side.

Moreover, it is preferable to provide a lighting device comprising: the insulated power supply device having configuration described above; an LED lamp that is connected to an output terminal of the insulated power supply device and is to be lighted by receiving a flow of the output current; and a control signal generation unit for generating the output control pulse signal, wherein the output control pulse signal is a dimming control pulse for controlling brightness of the LED lamp. In such a way, the brightness of the LED lamp can be controlled by the PWM pulse, and in addition, an LED lighting device in which linearity of the dimming control is good can be realized.

Effects of the Invention

In accordance with the present invention, there is an effect that the power supply device, which is excellent in responsiveness and is capable of controlling the output thereof by the external control signal, can be realized by one insulated AC-DC converter by providing the PWM control pulse signals individually to the primary side circuit and the secondary side circuit.

BEST MODE FOR CARRYING OUT THE INVENTION

A description is made of preferred embodiments of the present invention based on the drawings.

Figure 1:
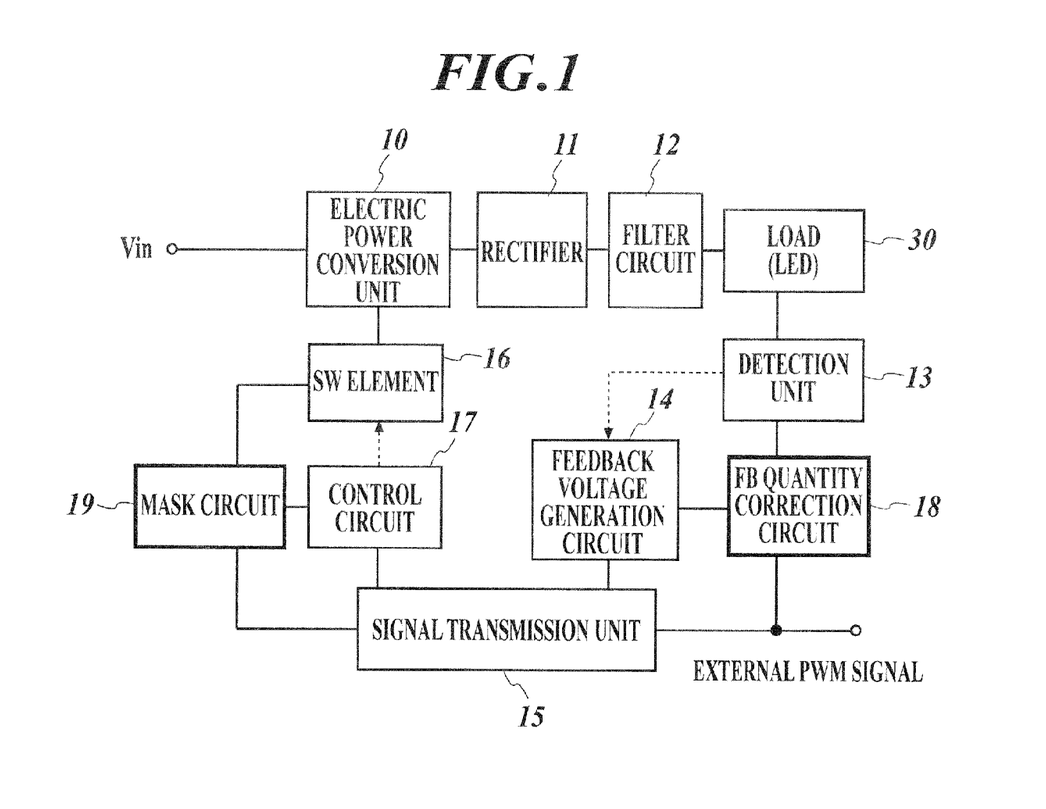
FIG. 1 is a block configuration diagram showing an embodiment of an insulated AC-DC converter as a power supply device effective by application of the present invention.

FIG. 1 is a block configuration diagram of a power supply device according to the present invention, which is composed of an insulated AC-DC converter and the like. Note that the description is made of the following embodiments while showing a power supply device that drives an LED as a load; however, the power supply device to which the present invention is applicable is not limited to the case where the load is the LED.

The power supply device according to the present invention includes: an electric power conversion unit 10 composed of a transformer that performs electric power conversion for an alternating current input voltage Vin, and the like; a rectifier 11 for rectifying the converted alternating current; a filter circuit 12 that passes voltage/current within a predetermined frequency band in rectified voltage/current therethrough and supplies the passed voltage/current to a load 30; a detection unit 13 for detecting a current flowing through the load 30; a feedback voltage generation circuit 14 that generates a feedback signal FB corresponding to a value of the detected current; an insulated signal transmission unit 15 for transmitting the feedback signal FB to a primary side, the insulated signal transmission unit 15 being composed of a photo coupler in which an input side and an output side are electrically insulated from each other, and the like; a switch unit 16 composed of a self-extinction element, such as a MOS transistor that flows a current through the primary side of the above-described electric power conversion unit 10; and a control circuit 17 that generates a pulse signal that performs ON/OFF control for the switch unit 16 in response to the signal transmitted by the above-described signal transmission unit 15.

Figure 3:
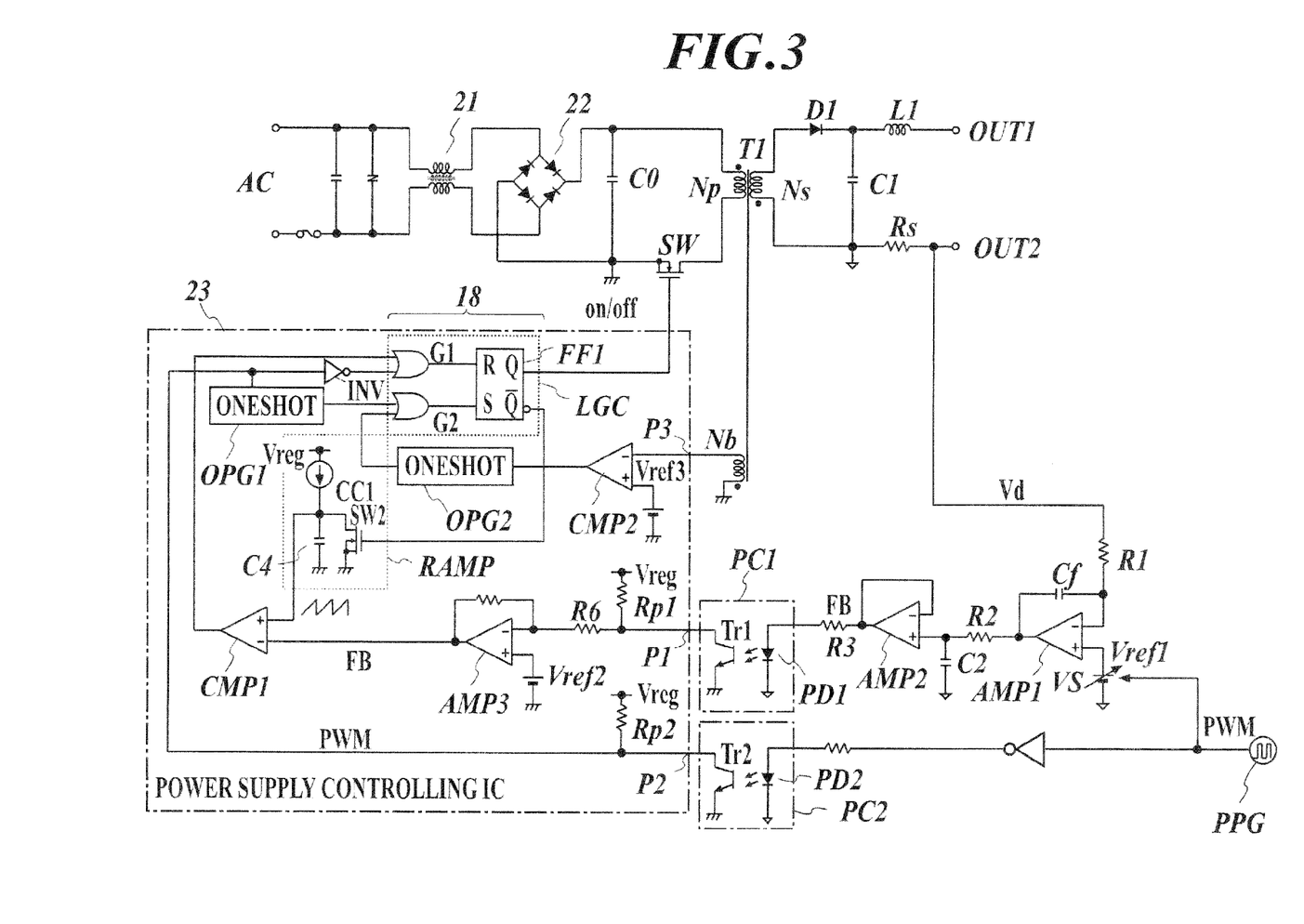
FIG. 3 is a circuit configuration diagram showing a specific configuration example of the insulated AC-DC converter of FIG. 1.

Note that the above-described rectifier 11 is composed of diodes, and the filter circuit 12 is composed of: a coil provided in series between the rectifier 11 and an output terminal to which the load is connected; a smoothing capacitor provided between the rectifier 11 and a grounding point, and the like (refer to FIG. 3).

Moreover, the power supply device according to the present invention includes: a feedback quantity correction circuit 18 that corrects the feedback signal FB, which is to be sent to the primary side by the feedback voltage generation circuit 14, in response to an external PWM control signal to be supplied thereto from the outside; and a mask circuit 19 that masks ON/OFF pulse signals to be outputted from the control circuit 17, and thins out pulses.

Note that, in the power supply device according to the present invention, the feedback signal generated by the feedback voltage generation circuit 14 and the external PWM control signal PWM are transmitted to a secondary side by the signal transmission unit 15, and the mask circuit 19 is configured so as to change a thinning amount in response to the transmitted PWM control signal. In a system in which a load is an LED lamp, the external PWM control signal is defined to be a signal for control dimming.

In FIG. 1, blocks 18 and 19 shown by bold frames are circuit blocks added in the present invention, and signal routes shown by broken lines are signal routes in a power supply device that does not have such additional blocks 18 and 19.

In FIG. 3, a specific circuit configuration of the insulated AC-DC converter of an embodiment of the power supply device of FIG. 1 is shown.

The power supply device of this embodiment include a noise blocking filter 21 made of a common mode coil or the like; a diode/bridge circuit 22 that rectifies an alternating current voltage (AC) and converts the alternating current voltage into a direct current voltage; a smoothing capacitor C0; a transformer T1 having a primary side winding Np, an auxiliary winding Nb and a secondary side winding Ns; a switching element SW composed of an N-channel MOS transistor as the switch unit 16 connected in series to the primary side winding Np of the transformer T1; and a power supply controlling IC (semiconductor integrated circuit) 23 having the control circuit 17 and the mask circuit 19 (an OR gate. G1 and a flip-flop FF1), which drive the switching element SW concerned.

The above-described electric power conversion unit 10 is composed of the diode/bridge circuit 22 and the transformer T1, which are described above. In a circuit in the power supply controlling IC 23, portions excluding the OR gates G1 and G2 and the flip-flop FF1 function as the control circuit 17.

On the secondary side of the above-described transformer T1, there are provided: a rectifying diode D1 connected in series between the secondary side winding Ns and an output terminal OUT1; and the filter circuit 12 having a capacitor C1 connected between a cathode terminal of this diode D1 and other terminal of the secondary side winding Ns and having a coil L connected in series to the rectifying diode D1. An alternating current induced in the secondary side winding Ns by intermittently flowing a current through the primary side winding Np is rectified, and the filter circuit 12 passes therethrough the voltage/current within the predetermined frequency band, and outputs the voltage/current concerned from the output terminal OUT1.

Moreover, between an output terminal OUT2 and the grounding point, there is connected a sense resistor Rs for detecting the current flowing through the load to be connected between the output terminals OUT1 and OUT2. Moreover, in this embodiment, a cutoff frequency of the filter circuit 12 composed of the coil L1 and the capacitor C2 is set so as to be lower than a switching frequency by the control circuit 17 and to be higher than a frequency of the external PWM control signal PWM, whereby a pulse current with the same frequency as the external PWM control signal PWM is outputted. In such a way, PWM dimming control is enabled.

Moreover, the cutoff frequency of the filter circuit 12 is set lower than the switching frequency by the control circuit 17, whereby switching noise on the primary side can be blocked and prevented from being transmitted to the output.

Figure 2:
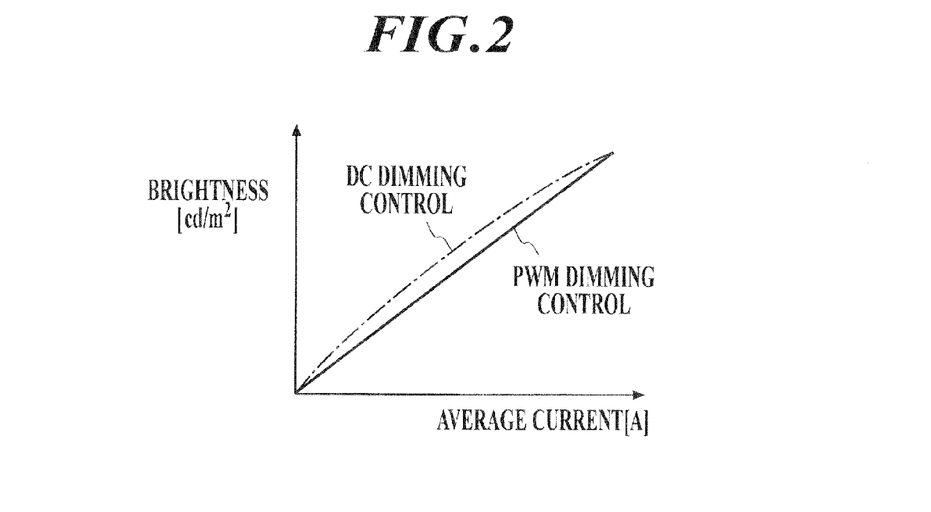
FIG. 2 is a graph showing relationships between an average output current and brightness of an LED in a case of controlling an output by a PWM control signal with regard to PWM dimming control and DC dimming control in the insulated AC-DC converter of FIG. 1, which drives an LED as a load.

Note that, in the case where the cutoff frequency of the filter circuit 12 is set lower than the frequency of the external PWM control signal PWM, a current with an absolute value corresponding to a duty ratio of the external PWM control signal PWM is outputted, whereby DC dimming control is enabled. In the case of the DC dimming control, as shown by an alternate long and short dashed line in FIG. 2, linearity of the brightness of the LED with respect to an average output current is deteriorated. However, as in the power supply device of this embodiment, the pulse current subjected to the PWM control is outputted, and the PWM dimming control is performed, whereby the linearity of the brightness of the LED with respect to the average output current can be enhanced. Moreover, in the DC dimming control, when an output current value is changed, a light emission color of the LED lamp is also changed; however, the above-described embodiment of performing the PWM dimming control is applied, whereby the change of the light emission color can also be reduced.

Moreover, on the secondary side of the transformer T1, there are provided: en error amplifier AMP1, which receives a voltage Vd, the voltage Vd being subjected to current/voltage conversion by the sense resistor Rs, at an inverting input terminal thereof through a resistor R1, receives a reference voltage Vref1 at a non-inverting input terminal thereof, and outputs a voltage corresponding to a value of the detected current; and a buffer amplifier (voltage follower) AMP2 that receives the output of the error amplifier and outputs a current of driving a photodiode PD1 of a photo coupler PC1.

Moreover, between an output terminal of the error amplifier AMP1 and the inverting input terminal, a phase compensating capacitor Cf is provided, and a low-pass filter is composed of the capacitor Cf and the above-described resistor R1. Then, the capacitor Cf is set so as to have a value (1+A)Cf substantially gain times an original capacitance value by a Miller effect of the amplifier concerned when viewed from an input side, functions as a filter with a low cutoff frequency, and can smoothen the voltage Vd to be changed in response to the output current.

In such a way, to the inverting input terminal of the error amplifier AMP1, a direct current voltage corresponding to an average voltage of the voltage Vd is inputted. Moreover, in the circuit of this embodiment, a resistor R2 and a capacitor C2 are connected between the error amplifier AMP1 and the buffer amplifier AMP2 at the subsequent stage thereto, and function as a secondary low-pass filter, in which a transfer function has two poles, together with the error amplifier AMP1, whereby a configuration is made so that the noise can be blocked.

Moreover, in this embodiment, a configuration is adopted so that a variable voltage source VS that generates the reference voltage Vref1 to be inputted to the error amplifier AMP1 can be provided, Vref1 can be changed in response to the duty ratio or pulse width of the PWM control signal PWM generated by an external PWM pulse generation unit PPG, and that such workings that compensate a change of the above-described voltage Vd to be changed can be performed in the case of inputting the PWM control signal PWM to the primary side circuit and controlling the output in a feed forward manner as will be described later. Moreover, between the secondary side and the primary side, there is provided a photo coupler PC2 for transmitting the external PWM control signal PWM, which is inputted to the secondary side, to such a power supply controlling IC 23 on the primary side.

The feedback voltage generation circuit 14 is composed of the above-described amplifiers AMP1 and AMP2, and the signal transmission unit 15 is composed of the photo couplers PC1 and PC2. In this embodiment, configuration is adopted so that the external PWM control signal PWM can be supplied to the primary side power supply controlling IC 23 to change the output current and to adjust the brightness of the LED lamp to be connected as the load, and in addition, that the reference voltage Vref1 to be generated by the variable voltage source VS can be changed by the external PWM control signal PWM so as to compensate an undesired change of the detection voltage Vd, which, is to be caused following the change of the output current, and the feedback voltage FB can be corrected to avoid the change of the detection voltage Vd. That is to say, a relative magnitude of the detection voltage Vd with respect to the reference voltage Vref1 is not allowed to be changed even if the duty ratio of the external PWM control signal PWM is changed.

Next, a description is made of the power supply controlling IC 23, which receives the feedback signal FB and the external PWM control signal PWM from the secondary side through the photo coupler PC1, and switches on/off the switching element SW.

In the power supply controlling IC 23, there are provided external terminals P1 and P2 to which collectors of light receiving transistors Tr1 and Tr2 which compose the photo couplers PC1 and PC2 are connected. The light receiving transistors Tr1 and Tr2 are configured so that emitter terminals thereof are connected to the grounding potential GND, and in addition, the external terminals P1 and P2 are configured so as to be connected to terminals to be applied through pull-up resistors Rp1 and Rp2, respectively with an internal voltage Vreg to be generated by an internal power supply circuit (not shown) provided in an inside of the power supply controlling IC 23, and so as to apply a bias to the light receiving transistors Tr1 and Tr2. In such a way, when photodiodes PD1 and PD2 of the photo couplers PC1 and PC2 are turned on in a state where Tr1 and Tr2 are biased by the internal voltage Vreg, collector currents flow through Tr1 and Tr2, potentials of the external terminals P1 and P2 drop by a voltage drop of the resistors Rp1 and Rp2, and the internal circuit amplifies the potentials, and performs control operations.

Moreover, in the above-described power supply controlling IC 23, there are provided: an error amplifier AMP3, which receives the voltage of the external terminal P1 at an inverting input terminal thereof though a resistor R6, receives a reference voltage Vref2 at a non-inverting input terminal thereof, and outputs a voltage corresponding to a potential difference between the voltage of the external terminal P1 and the reference voltage Vref2; a waveform generation circuit RAMP composed of a constant power supply CC1, a capacitor C4 and a discharging MOS transistor SW2; and a comparator (voltage comparison circuit) CMP1 that compares an output of the above-described error amplifier AMP3 and a waveform signal generated by the waveform generation circuit RAMP with each other.

The waveform generation circuit RAMP repeats operations, in which the capacitor C4 is charged by a current of the constant power supply CC1, whereby an output gradually rises, and the switching element SW2 is switched on, whereby electric charges of the capacitor C4 are emitted in one stroke and the output suddenly drops. In such a way, the waveform generation circuit RAMP generates a sawtooth waveform signal. The comparator CMP1 functions as a PWM comparator that generates a local PWM pulse having a pulse width corresponding to the output of the error amplifier AMP3.

Moreover, in the above-described power supply controlling IC 23, there are provided: a one-shot pulse generation circuit OPG1 that detects a leading edge of a voltage of the external terminal P2 and generates a pulse signal; an external terminal P3 to which one of terminals of the auxiliary winding Nb provided in the transformer (10) is connected; a comparator CMP2, in which an inverting input terminal is connected to the external terminal P3 concerned, and a reference voltage Vref3 is applied to a non-inverting input terminal; a one-shot pulse generation circuit OPG2 that detects a leading edge of an output of the comparator CMP2 and generates a pulse signal; and a logic circuit LGC that generates an ON/OFF control signal on/off of the switching element SW in response to signals from these circuits.

The logic circuit LGC is composed of: an OR gate G1 that receives a potential obtained by inverting the voltage of the external terminal P2 by an inverter INV, and an output of the comparator CMP1; an OR gate G2 that receives outputs of the one-shot pulse generation circuits OPG1 and OPG2; and the RS flip-flop FF1, in which an output of the OR gate G1 is inputted to a reset terminal R, and an output of the OR gate G2 is inputted to a set terminal S.

The RS flip-flop FF1 is a reset-preferential flip-flop. An output Q of FF1 is outputted as the ON/OFF control signal on/off of the switching element SW to the outside of the IC, and an inverted output/Q of FF1 is supplied as a signal, which serves as a signal that performs ON/OFF control for the discharging MOS transistor SW2 of the waveform generation circuit RAMP, to a gate terminal of SW2.

During a period while the external PWM control signal PWM to be inputted from the external terminal P2 is at a low level, the OR gate G1 and FF1 function as a mask circuit that forcibly sets the output Q of the RS flip-flop FF1 to a low level and inhibits output of the ON/OFF control signal on/off. Moreover, at timing when the external PWM control signal PWM is changed to a high level, a one-shot pulse is generated by OPG1, the RS flip-flop FF1 is set, and the mask is released.

In the AC-DC converter of this embodiment, at timing when the voltage to be induced in the auxiliary winding Nb becomes the reference voltage Vref3 or less, that is, at ting when the current of the auxiliary winding is decreased to some extent, the output of the comparator CMP2 is changed to the high level, the one-shot pulse is generated by OPG2, and the flip-flop FF1 is set to the set state. Then, the control signal on/off is changed to the high level, the switching element SW is switched on, and the current is flown through the primary side winding Np, and in addition, at the point of time when SW2 in the waveform generation circuit RAMP is switched off, and the input of the comparator CMP1 gradually rises to become higher than the feedback signal FB, reset is applied to the flip-flop FF1. Then, the control signal on/off is changed to the low level, and the switching element. SW is switched off, and in addition, SW2 in the waveform generation circuit RAMP is switched on, the capacitor is charged, and the waveform signal drops.

Figure 9:
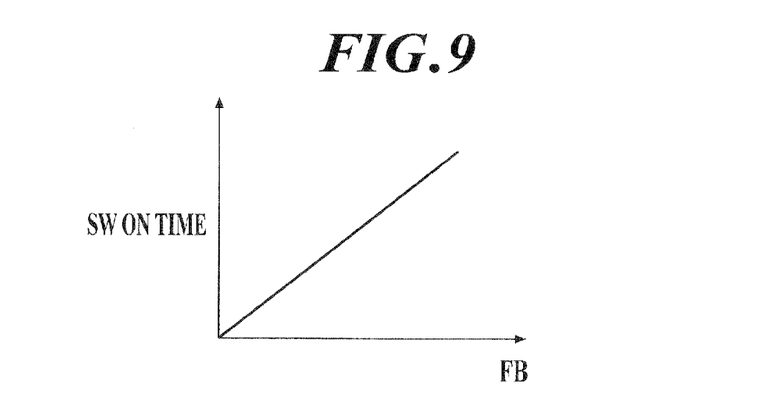
FIG. 9 is a graph showing a relationship between a feedback signal FB to the primary side control circuit and an ON time of a switching element SW in the insulated AC-DC converter of the embodiment.

The above-described operations are repeated, whereby the period while the current is flown through the primary side winding Np is controlled so that the feedback signal FB can become constant, and a pulse width of an output current pulse is controlled. In FIG. 9, a relationship between the feedback signal FB and such an ON time of the switching element SW in the insulated AC-DC converter of this embodiment is shown. As shown in FIG. 9, the ON time of the switching element SW is controlled so as to become substantially proportional to the feedback signal FB. Note that the ON/OFF control for the current of the primary winding Np by the switching element SW is performed at a frequency sufficiently higher than a frequency of the input voltage.

Figure 4A:
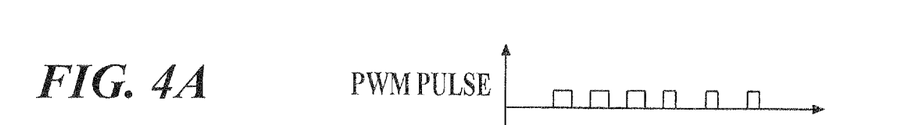
FIG. 4A is a waveform chart showing a waveform of a PWM control signal for output control in a case of providing a smoothing capacitor on a primary side.
Figures 4B, 4C:
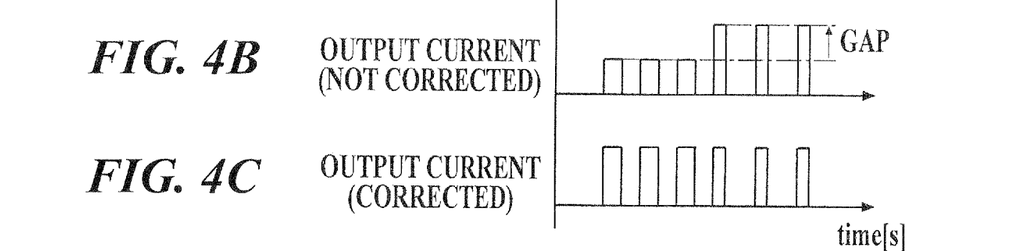
FIG. 4B is waveform chart showing an output waveform in a case of not providing a correction unit on a secondary side.
FIG. 4C is a waveform chart showing. an output waveform in a case of providing the correction unit on the secondary side, in the insulated AC-DC converter of the embodiment.

Here, a description is made of a function of the above-described mask circuit 19 (G1, FF1) by using FIGS. 4A-C. FIG. 4A shows the waveform of the external PWM control signal PWM, FIG. 4B shows an output power waveform in the case where the correction of the reference voltage Vref1 is not performed, and FIG. 4C shows an output power waveform in the case where this embodiment is applied and the correction of the reference voltage Vref1 is performed. As shown in FIGS. 4A-C, in the AC-DC converter of this embodiment, during the period while the external PWM control signal PWM is at the low level, the output of the flip-flop FF1 is fixed at the low level, that is, the output of the internal PWM pulse is masked to prevent the switching element SW from being switched on, whereby it is made possible to control the output current by the external PWM control signal PWM.

Incidentally, as described above, in the case where the external PWM control signal PWM is inputted to the power supply controlling IC 23, the output of the local PWM pulse in the inside thereof is masked, and the output current is controlled, if this state is left as it is, then the detection voltage Vd is changed by an amount that the duty of the external PWM control signal PWM is changed, the feedback signal FB is deviated, and as shown in FIG. 4B, a peak value becomes undesirably high.

Figure 7:
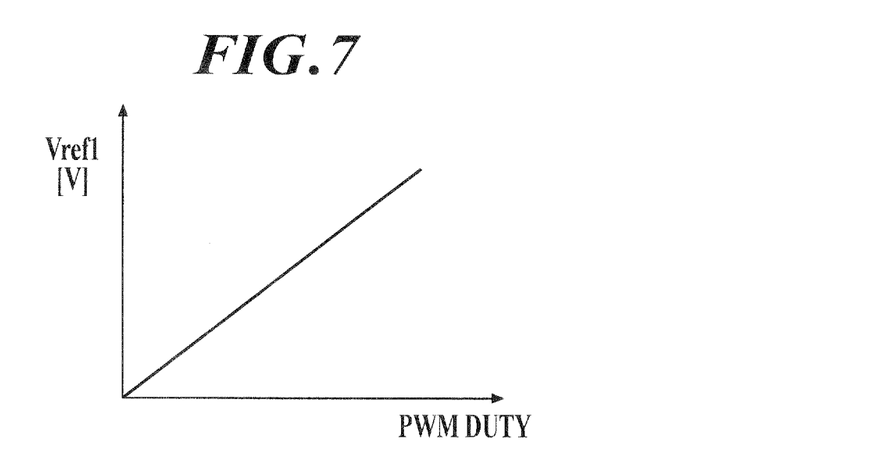
FIG. 7 is a graph showing a relationship between a duty of the PWM control signal for the output control and a reference voltage to be inputted to the secondary side error amplifier in the insulated AC-DC converter of this embodiment.

In this connection, in the AC-DC converter of this embodiment, a configuration is adopted, in which the reference voltage Vref1 to be applied to the non-inverting input terminal of the error amplifier AMP1 provided on the secondary side is generated by the variable voltage supply VS, and such a correction is performed that compensates the change of the detection voltage Vd by raising Vref1 in proportion to the duty ratio or pulse width of the external PWM control signal PWM as shown in FIG. 7. The correction as described above is performed, whereby such a malfunction can be prevented, in which, by inputting the external PWM control signal PWM to the power supply controlling IC 23 on the primary side, the detection voltage Vd is changed, the feedback signal FB is deviated, and the peak value of the output current is changed. That is to say, in accordance with the present embodiment, even if the external PWM control signal PWM is changed, the feedback signal FB can be prevented from being changed.

FIGS. 4A-C, the following is understood. In the event where the duty ratio (pulse width) of the external PWM control signal PWM is changed, in the case where the correction of the reference voltage Vref1 is not performed, the detection voltage Vd is changed, whereby the peak of the output current becomes high as shown in FIG. 4B, and it becomes impossible to perform desired control. As opposed to this, in the case where the correction of the reference voltage Vref1 is performed, a height of the waveform of the output power can be maintained substantially constant as shown in FIG. 4C, and desired PWM dimming control can be performed.

Note that it is recommended to decide a correction amount by the control for the reference voltage Vref1 so that an average value of output currents to be blocked by masking the internal PWM pulse by the mask circuit of the power supply controlling IC 23 on the primary side and a value obtained by converting the correction amount of the reference voltage Vref1 into a variation of the output current can become the same.

As described above, the description of this embodiment is made based on the way of thinking that the correction amount by the correction unit on the secondary side is decided in response to the external PWM control signal PWM to be inputted to the power supply controlling IC 23 on the primary side. However, when views are changed, this embodiment can also be grasped as an invention that changes the duty (pulse width) of the external PWM control signal, which is to be inputted to the power supply controlling IC 23 on the primary side, in response to a variation of the reference voltage of the error amplifier on the second side.

Figure 5A:
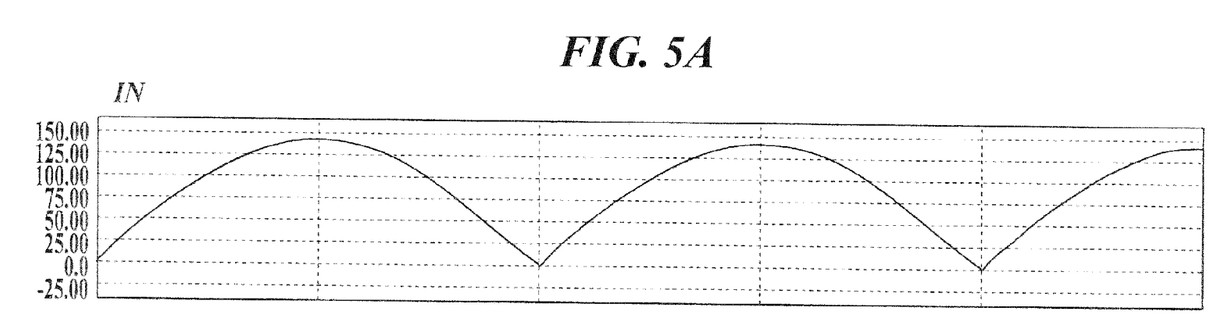
FIG. 5A is a waveform chart showing an input waveform in a case where a capacitance value of the smoothing capacitor on the primary side is reduced.
Figure 5B:
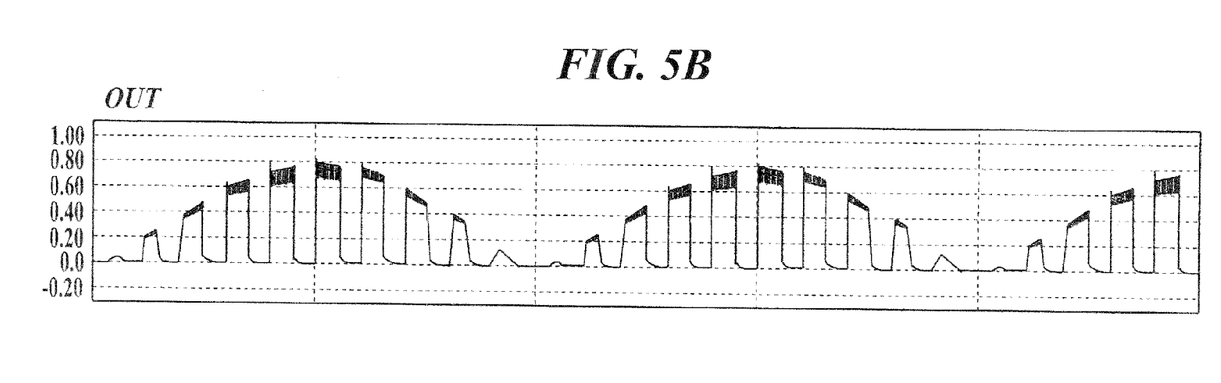
FIG. 5B is a waveform chart showing an output waveform in case where the capacitance value of the smoothing capacitor on the primary side is reduced as in FIG. 5A.
Figure 5C:
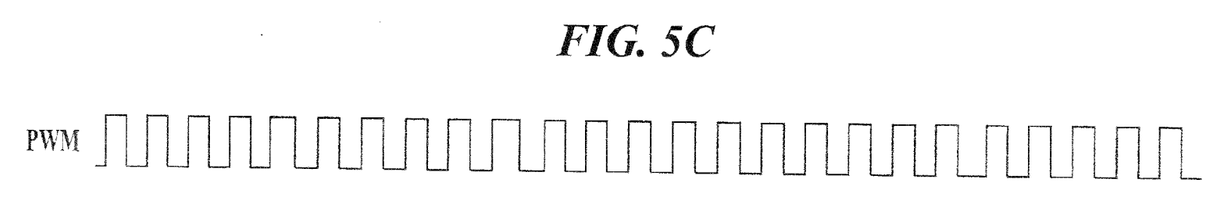
FIG. 5C is a waveform chart showing a waveform of the PWM control signal for the output control in the insulated AC-DC converter of the embodiment of FIG. 3.

Incidentally, the waveforms of FIGS. 4A-C are those in the case of using a capacitor with a relatively large capacitance value as the capacitor C0 that smooths the output of the diode/bridge 22. In FIGS. 5A-5C, there are shown waveforms in the case of not providing the capacitor C0 that smooths the output of the diode/bridge 22 or the case of using a capacitor C0 with a small capacitance value.

FIG. 5A shows an input waveform from the diode/bridge 22, which is to be applied to the primary side winding Np of the transformer T1, FIG. 5B shows a waveform to be induced in the secondary side winding Ns of the transformer T1, and FIG. 5C shows a waveform of the external PWM control signal PWM. In the case of using a capacitor C0 with a small capacitance value, in the event where the switching element SW is switched on, the electric charges are drawn from the capacitor C0, and the voltage drops, and such a voltage VC0 to be applied to the primary winding Np becomes a pulsating flow. Then, the current flowing through the primary winding Np becomes a pulsating flow following the waveform of VC0, and accordingly, there is an advantage that a power factor of the AC-DC converter can be improved.

Next, a description is made of advantages of the AC-DC converter of this embodiment, which is configured to perform the output control by inputting the external PWM control signal PWM to the power supply controlling IC 23 on the primary side and to the error amplifier on the secondary side.

Figure 6A:
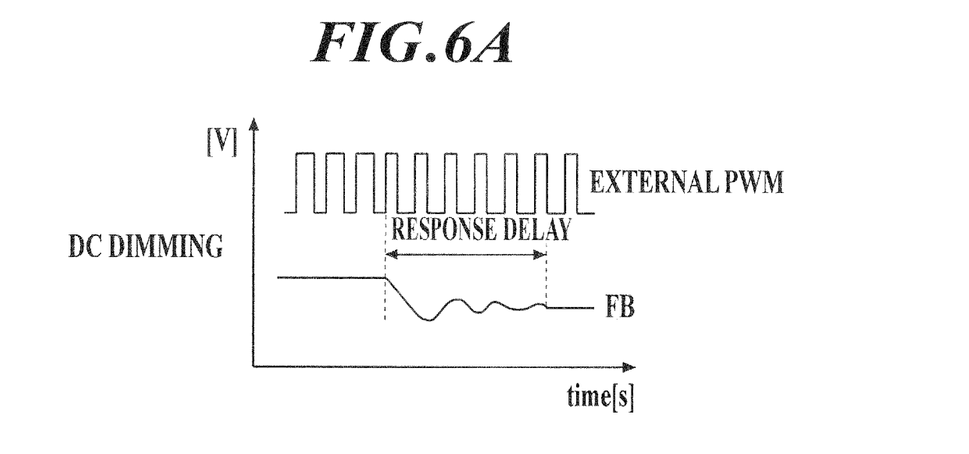
FIG. 6A is an explanatory view showing a difference in influence to a feedback signal in a case of performing DC dimming control by changing a reference voltage on a secondary side by the PWM control signal in the insulated AC-DC converter that drives the LED as the load.

As a method of performing the output control by the external control signal, there is conceived a method of performing the output control by changing only the reference voltage Vref1, which is to be applied to the error amplifier AMP1 on the secondary side, by the external control signal, and this method is more simple and easier. However, in the control as described above, the transmission of the feedback signal FB becomes slow by the time constant owned by the error amplifier AMP1 (low-pass filter) provided on the secondary side, and when the duty ratio of the PWM control signal PWM is changed, it takes time to converge the feedback signal FB as in FIG. 6A, and accordingly, the responsiveness of the circuit is lowered.

Figure 6B:
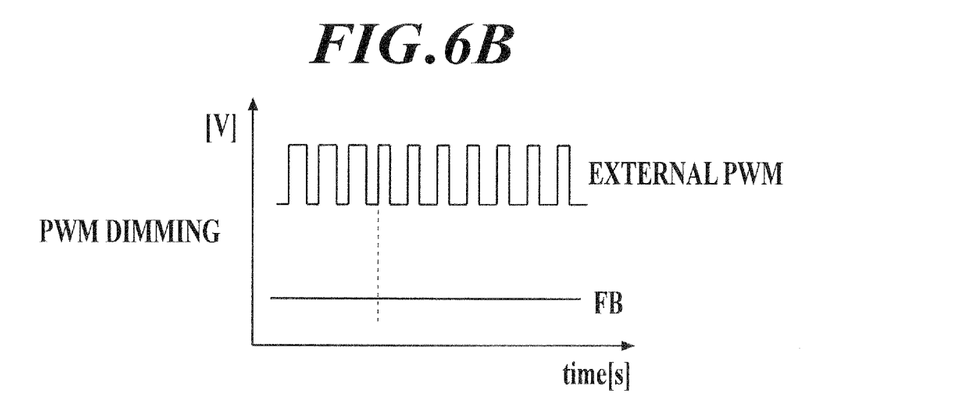
FIG. 6B is an explanatory view showing an influence to the feedback signal in the embodiment of inputting the PWM control signal to a primary side control circuit and a secondary side error amplifier, and in addition, of providing a feedback quantity correction circuit to perform the PWM dimming control.

As opposed to this, as in the AC-DC converter of this embodiment, in the case where the output control is configured to be performed by inputting the external PWM control signal PWM to the power supply controlling IC 23 on the primary side and the error amplifier on the secondary side, the responsiveness of the circuit to the external PWM control signal becomes high. In addition, even if the duty ratio of the external PWM control signal PWM is changed by the fact that the feedback quantity correction circuit 18 is provided, the relative magnitude of the detection voltage Vd with respect to the reference voltage Vref1 is not allowed to be changed, and as in FIG. 6B, the feedback signal FB is not changed, and hence, the time required for the convergence can be removed. As described above, the AC-DC converter of this embodiment has such advantages.

Figure 8:
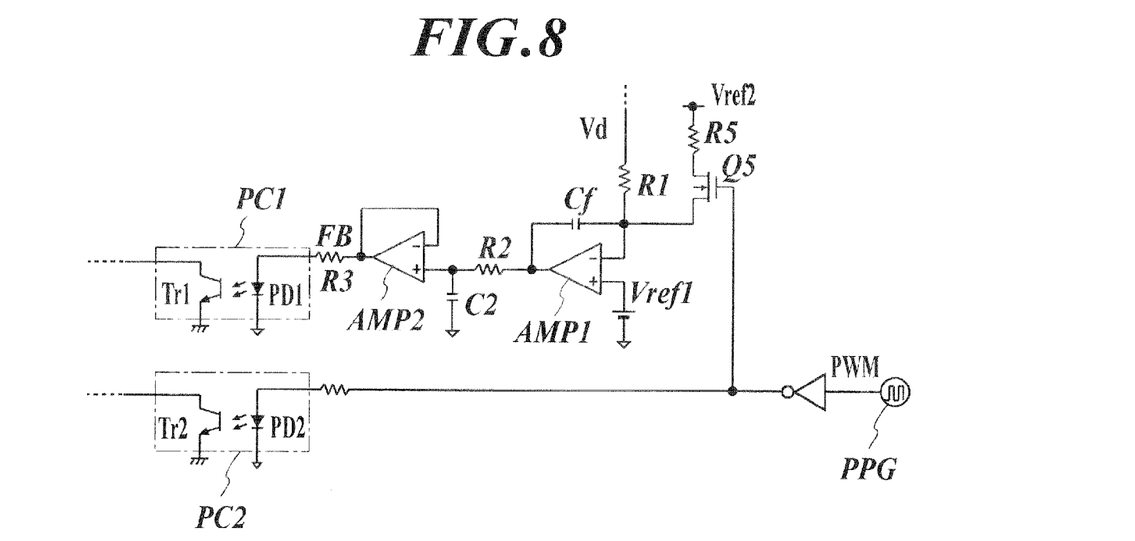
FIG. 8 is a circuit diagram showing another embodiment of the feedback quantity correction circuit.

In FIG. 8, another embodiment of the feedback quantity correction circuit 18 is shown.

In the embodiment of FIG. 3, the configuration is adopted so that the reference voltage Vref1 to be supplied to the error amplifier AMP1 that detects the output current can be generated by the variable voltage source VS, and that the reference voltage Vref1 to be generated by the variable voltage source VS can be changed in response to the duty ratio of the external PWM control signal PWM.

As opposed to this, in the embodiment of FIG. 8, the reference voltage Vref1 is generated by a constant voltage source, and is left fixed, and in addition, between the reference voltage Vref2 and the inverting input terminal of the error amplifier AMP1, a resistor R5 and an N-channel MOS transistor Q5, which are connected in a serial connection mode, are provided, and the external PWM control signal PWM is inputted to a gate terminal of Q5 to allow Q5 to perform the ON/OFF operation. Note that a connection order of the resistor R5 and the transistor Q5 may be inverse.

The feedback quantity correction circuit 18 of this embodiment (FIG. 8) functions to raise or drop an average potential of the voltage, which is to be inputted to the inverting input terminal of the error amplifier AMP1, in response to the duty ratio of the external PWM control signal PWM. That is to say, such a configuration is adopted so that a filter circuit can be composed of: the resistor R5 connected in series to the transistor Q5 to be switched on/off by the external PWM control signal PWM; and a capacitor Cf connected between the inverting input terminal and output terminal of the error amplifier AMP1, that the pulse of the external PWM control signal PWM can be averaged by this filter circuit to generate a potential proportional to the duty, and that the potential concerned can be added to a voltage obtained by smoothing the voltage Vd subjected to the current-voltage conversion by the sense resistor Rs and can be inputted to the error amplifier AMP1.

In such a way, the feedback quantity correction circuit 18 of FIG. 8 will operate so that the voltage of the (−) input terminal of the error amplifier AMP1 cannot be changed even if the duty ratio of the external PWM control signal PWM is changed.

Also for the control circuit of the variable voltage source VS by the external PWM control signal PWM in the embodiment of FIG. 3, a similar configuration to that of FIG. 8 can be adopted. That is to say, a configuration can be adopted so that the PWM signal can be averaged by a MOS transistor and a filter circuit, and that the variable voltage source VS can be controlled by a voltage thus obtained to change the reference voltage Vref1.

Note that, in order to compose the feedback quantity correction circuit 18 of the variable voltage source VS, and with regard to a correction in the same direction as the embodiment of FIG. 3, in which the reference voltage Vref1 to be inputted to the non-inverting input, terminal of the error amplifier AMP1 is changed in proportion to the duty of the external PWM control signal PWM, in order to allow the embodiment of FIG. 8 in which other configurations are the same as those of FIG. 3 to perform the correction concerned, an external PWM control signal PWM in a relationship of an opposite phase to the case of FIG. 3 just needs to be inputted to a gate terminal of the transistor Q5.

The description has been specifically made above of the invention, which is made by the inventor of the present invention, based on the embodiments; however, the present invention is not limited to the above-described embodiments. For example, in the embodiment of FIG. 3, the load is a current load, and the power supply circuit is a circuit of a current output type, and accordingly, the sense resistor Rs is provided between the output terminal OUT2 and the grounding point, and the output current is detected. However, in a power supply circuit of a voltage output type, which performs control for an output voltage by a PWM signal, a voltage division circuit composed of a resistor and the like in a serial connection mode may be provided between the output terminal OUT1 and the grounding point, and the output voltage may be detected.

Moreover, in the above-described embodiments, the collectors of the light receiving transistors which compose the photo couplers are connected through the pull-up resistors to the terminals to which the internal reference voltage is applied; however, a configuration may be adopted so that the pull-up may be performed by a constant current source in place of the pull-up resistors. Moreover, a configuration may be adopted so that the collectors of the light receiving transistors can be directly connected to the internal reference voltage terminals, and in addition, emitter resistors can be provided, and that feedback signals can be taken out from the emitter terminals.

Moreover, in the above-described embodiments, as the switching element SW that intermittently flows the current through the primary side winding of the transformer, there is used an element (MOS transistor) separate from the power supply controlling IC 23; however, this switching element SW may be taken into the power supply controlling IC 23, and both thereof may be composed as one semiconductor integrated circuit. Moreover, the switching element SW is not limited to the MOS transistor, and may be a bipolar transistor.

INDUSTRIAL APPLICABILITY

In the above-described embodiments, the description has been made of the case of applying the present invention to the power supply device that drives the LED lamp as the load; however, the present invention is not limited to the case where the load is the LED lamp, and can be widely applied to the insulated power supply device in general.

EXPLANATION OF REFERENCE NUMERALS

10 ELECTRIC POWER CONVERSION UNIT
11 RECTIFIER
12 FILTER CIRCUIT
13 DETECTION UNIT
14 FEEDBACK VOLTAGE GENERATION CIRCUIT
15 SIGNAL TRANSMISSION UNIT
16 SWITCH UNIT (SWITCHING ELEMENT)
17 CONTROL CIRCUIT
18 FEEDBACK QUANTITY CORRECTION CIRCUIT
19 MASK CIRCUIT
21 FILTER
22 DIODE/BRIDGE CIRCUIT (RECTIFIER CIRCUIT)
23 POWER SUPPLY CONTROL CIRCUIT (POWER SUPPLY CONTROLLING IC)
AMP1 ERROR AMPLIFIER
AMP2 BUFFER AMPLIFIER
PC1, PC2 PHOTO COUPLER
CMP1, CMP2 COMPARATOR
OPG1, OPG2 ONE-SHOT PULSE GENERATION CIRCUIT
RAMP WAVEFORM SIGNAL GENERATION CIRCUIT
LGC LOGIC CIRCUIT

The invention claimed is:

1. An insulated power supply device comprising:
an electric power conversion unit for converting alternating current power inputted to a primary side of the electric power conversion unit and outputting the power to a secondary side of the electric power conversion unit;
a rectifier provided on the secondary side of the electric power conversion unit;
a filter that passes therethrough voltage/current within a predetermined frequency band in voltage/current rectified by the rectifier;
a detection circuit for detecting an output current or an output voltage, which is to be supplied to a load through the filter;
a control circuit that generates and outputs a control signal for a switching element that controls a current in response to a detection signal by the detection circuit, wherein the current is to be flown through the primary side of the electric power conversion unit; and
a signal transmission unit for transmitting the detection signal by the detection circuit to the control circuit;
wherein:
an output control signal is configured to be supplied to both of the control circuit and the detection circuit, and to control the output current or the output voltage,
the output control signal is an output control pulse signal having control information in a duty ratio, and the filter is configured so that a cutoff frequency thereof can become higher than a frequency of the output control pulse signal,
the control circuit includes a mask circuit that blocks the control signal, which is to be supplied to the switching element, based on the output control pulse signal, and
the detection circuit includes a correction unit for compensating, based on the output control pulse signal, a drop of the detection signal which is caused by the mask circuit blocking the control signal, and for performing a correction so that a feedback signal to the control circuit cannot be changed.

2. The insulated power supply device according to claim 1, wherein:
the control circuit includes a comparator circuit that compares a waveform signal with a frequency higher than the frequency of the output control pulse signal and the feedback signal transmitted from the secondary side of the electric power conversion unit by the signal transmission unit, and that generates a PWM control pulse as the control signal of the switching element, and
the mask circuit is configured to be capable of controlling supply of the PWM control pulse to the switching element based on the output control pulse signal.

3. The insulated power supply device according to claim 1, wherein the detection circuit includes an error amplifier circuit that outputs a signal proportional to a potential difference between a predetermined reference voltage and a voltage corresponding to the output current or the output voltage, and to the reference voltage or a detection voltage, the correction unit inputs, as a correction signal, a voltage relatively changed in response to the duty ratio of the output control pulse signal.

4. The insulated power supply device according to claim 3, wherein:
the electric power conversion unit includes a diode/bridge circuit that rectifies an alternating current, and a transformer through which the current rectified by the diode/bridge circuit is to be flown, and to a primary side winding of the transformer, a pulsating flow voltage is applied and a pulsating flow current is flown.

5. The insulated power supply device according to claim 2, wherein the filter is set so that the cutoff frequency can become higher than the frequency of the output control pulse signal and lower than a frequency of the PWM control pulse.

6. A lighting device comprising:
the insulated power supply device according to claim 1;
an LED lamp that is connected to an output terminal of the insulated power supply device and is to be lighted by receiving a flow of the output current; and
a control signal generation unit for generating the output control pulse signal,
wherein the output control pulse signal is a dimming control pulse for controlling brightness of the LED lamp.

* * * * *